INVENTOR.
ROBERT A. STEVENSON

BY
Richard M. Rabin

ATTORNEY

INVENTOR.
ROBERT A. STEVENSON

BY *Richard M. Rabkin*

ATTORNEY

United States Patent Office 3,539,868
Patented Nov. 10, 1970

3,539,868
POWER REVERSAL PROTECTION SYSTEM
Robert A. Stevenson, Toronto, Ontario, Canada, assignor to Federal Pacific Electric Company, Newark, N.J., a corporation of Delaware
Filed Sept. 12, 1968, Ser. No. 759,408
Int. Cl. H02h 3/18
U.S. Cl. 317—27                  10 Claims

ABSTRACT OF THE DISCLOSURE

A system for sensing reverse current in an alternating current system by comparing the phase relationship between the voltage and current of the system. This is accomplished by providing a pulse forming means connected to one of the input quantities, wherein the pulse has time and polarity relationship to the other input quantity. Comparison means is provided responsive to the pulse and the other input quantity. The output from the comparison means is fed to a circuit breaker which is operative to disconnect the load upon the occurrence of a reverse flow of current.

---

Figure 1:
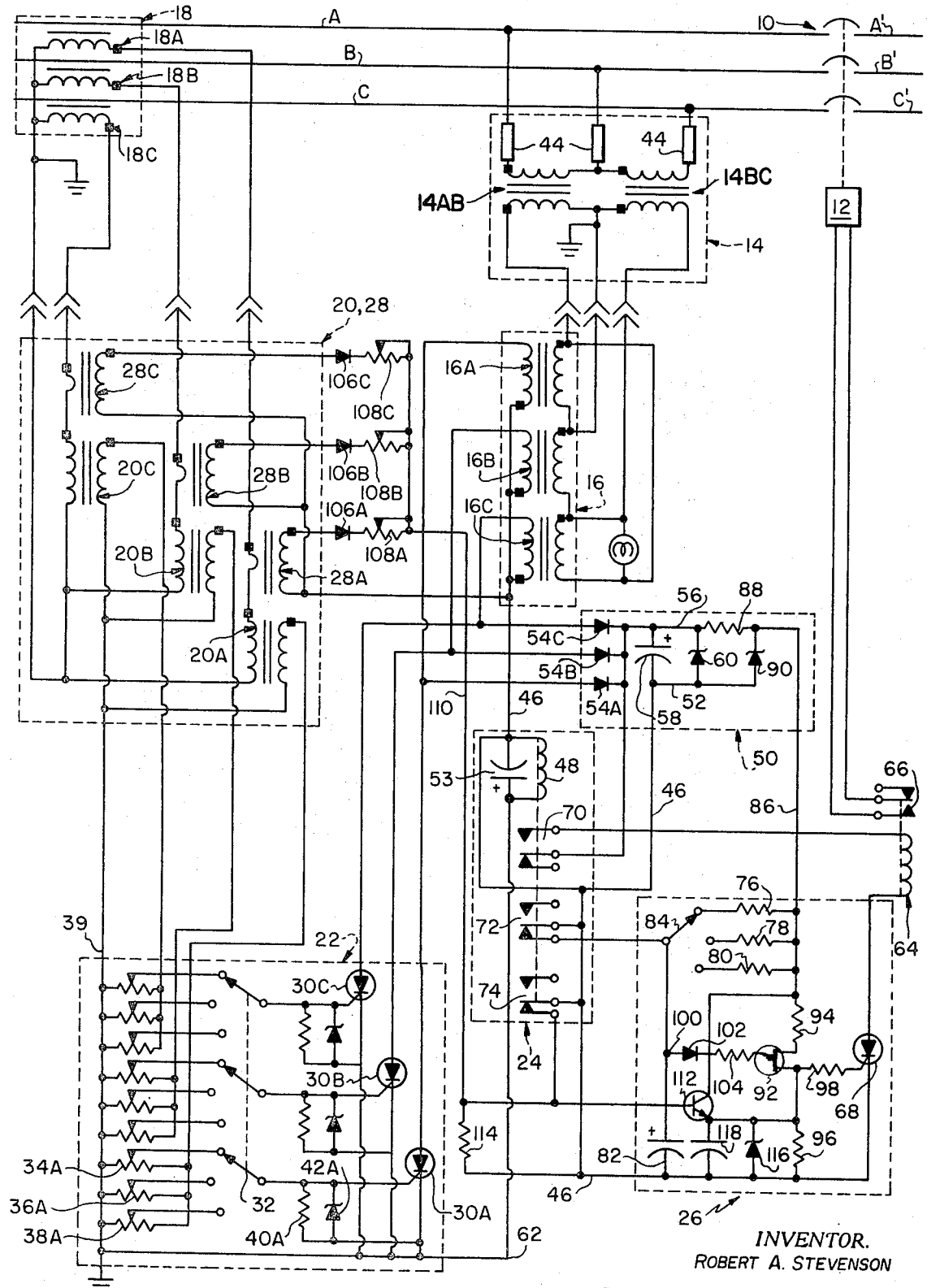

This invention relates to electrical power distribution systems and more particularly to the protection of such power systems from undesired reverse power flow.

Reverse power relays of various types have been proposed for use in protecting distribution and transmission systems against current or power flow reversal. These relays have proven to be unsatisfactory because of false actuation, cost and complexity. Power flow reversals can occur in many forms; as an example where two power sources feed a common distribution network or load through transformers. In the event of a power failure or feeder failure on one side of the transformers feeding power to the monitored network, the power direction as to the adjacent transformer will reverse because of power flowing from the first source to the fault. When such faults occur it is extremely important to disconnect the network from the faulted breaker to avoid complete failure of the system.

Among the prior art reverse flow detectors have been those utilizing the principles of induction type relays. These devices were particularly subject to false operation when the monitored network experienced widely varying power factors. Those skilled in the art will recognize that the power factor of a given network is the phase angle relationship of the current and voltage of the system and is dependent on the connected load and on the design characteristics of the network. Unity or 1.0 power factor is the desired condition in most instances. However, changing electrical conditions of the network cause changes in the power factor. An unloaded transmission line may have a power factor in the neighborhood of 0.9 leading yet where a connected load consists only of transformers the power factor may be 0.3 lagging. It is because of this wide range of power factors which signify a change in phase relationship between the current and the voltage that conventional reverse current relays have been generally unsatisfactory. An object of this invention is to provide an improved reverse current relay operable over a wide range of power factors. It is another object of this invention to provide an improved inverse current relay which is insensitive to change in power factor over a wide range.

While it is extremely important that a reverse current relay operate with a high degree of sensitivity to current reversal, it is also vitally important that the relay not operate on forward current fault conditions when, due to the nature of the system, the power factor could be heavily lagging. It is still another object of this invention to provide an improved reverse current relay capable of operation over a wide range of power factors with improved response characteristics.

Another object of this invention is to provide an improved reverse current relay having selectable trip values of reverse current with predetermined time delays before operation of the associated circuit interrupting device and which relay is capable of causing instantaneous operation of the device at reverse currents approaching the forward full load current rating.

The above and other objects of the invention are accomplished in the illustrative reverse current protective system described below as an embodiment of the invention in its various aspects. Briefly, the illustrative embodiment comprises a reverse current sensing network for protecting an alternating current system against reverse current. It includes a first sensing means connected between a first and second conductor of the system to provide a first electrical signal responsive to the voltage between the conductors. Second sensing means is operatively connected to the first conductor to provide a second electrical signal responsive to the current in the conductor. The polarity relationship of the first signal and the second signal is determined by a comparison means. Output means are connected to the comparison means for initiation of the operation of the output means in response to one relationship of the first and second signals wherein one of said signals is a pulse, the initiating relationship being that which corresponds to the reversal of the direction of current flow through the system.

Figure 2:
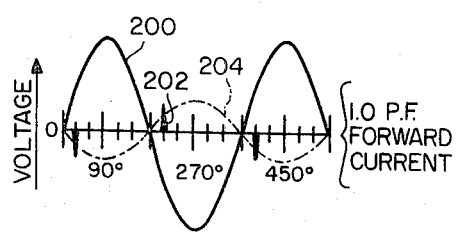
Figure 5:
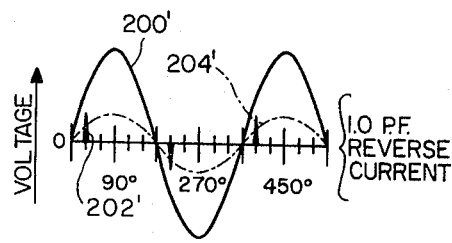
Figure 3:
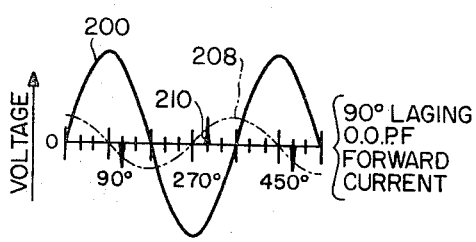
Figure 6:
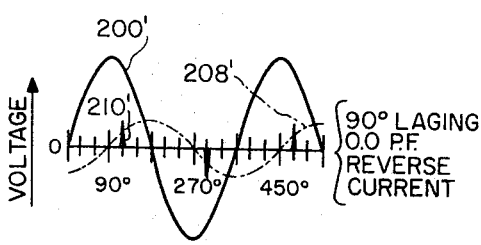
Figure 4:
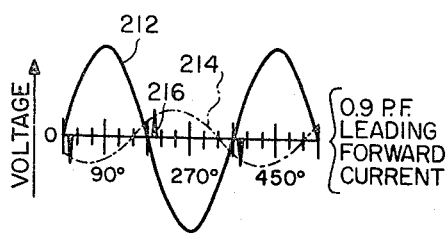
Figure 7:
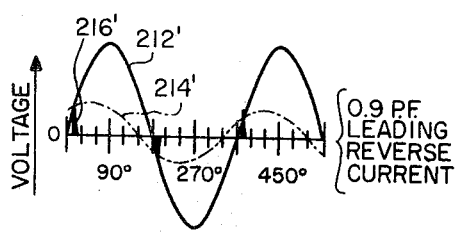

The nature of the invention and its various further aspects, and features of novelty will be appreciated from the illustrative disclosure that is given in detail below, and from the accompanying drawings which form part of this disclosure. In the drawings:

FIG. 1 is a schematic diagram of an alternating current system protected in each of its phases by the reverse current relay which is an embodiment of the invention; and FIGS. 2 through 7 are voltage-current diagrams of certain voltage relationships in the illustrated embodiment:

FIG. 2 illustrates forward current, unity power factor;
FIG. 3 illustrates forward current, 90° lag, zero power factor;
FIG. 4 illustrates forward current, 0.9 leading power factor;
FIG. 5 illustrates reverse current, unity power factor;
FIG. 6 illustrates reverse current, 90° lag, zero power factor; and
FIG. 7 illustrates reverse current, 0.9 leading power factor.

Referring to FIG. 1, circuit breaker 10 connects the conductors A, B, C of the three phase distribution system to the corresponding feeder circuit which has conductors A', B', C'. The circuit breaker 10 includes electrically actuated operating mechanism 12 for opening the contacts of the circuit breaker in response to either overcurrent in the protected conductors A, B, C or reversal of the normal direction of power flow from conductors A', B', C' to conductors A, B, C. Standard overcurrent monitoring means, not shown, is used with circuit breaker 10 in a manner well known in the art and does not form a part of the present invention. One method of determining whether or not a reversal of alternating current power flow has occurred utilizes comparison of the electrical time or phase relationship between current and voltage. Some difference in phase between the current and voltage sine waves is expected. (Power factor is the ratio of the average power input to the product of RMS current and RMS voltage. With sinusoidal current and voltage, and an angle θ expressing the phase difference between them; Power factor= cos θ.) Once the normal relationship of current and voltage is found, if a phase reversal of θ=180° occurs, then the direction of power flow has reversed. Reversals of power flow sometimes occur on distribution networks for a short time due to operation of protective device or the like on the network which generates a large reverse voltage. These impulses or power reversals are of short duration and therefore operation of the power flow reversal protection device should not occur. However, where a persistent power flow reversal does occur then the network must be protected. Additionally, if the power reversal is of such magnitude that 100% of the normal power or power in excess thereof is flowing in the reverse direction then instantaneous operation of the protective system is desirable.

Referring to FIG. 1 there is illustrated a reverse current protective system applied to a 3 phase, 3 conductor, alternating current network. Generally a first electrical signal responsive to the phase voltages of the conductors is provided by network potential transformers 14 and relay potential transformers 16. The transformer network provides signals representing the phase voltages that are in phase with (or 180° out of phase with) the currents carried by the line conductors at unity power factor. A second signal representative of the current on the conductors is developed by a sensing network that includes network current transformers 18 and a first set of relay current transformers 20a, 20b, 20c. The phase-time relationships of the first and second signals are compared at electrical comparison means 22. When the network current is flowing in the proper direction, as established during the initial installation of the apparatus, there is no output from the comparison means. However, when the current direction reverses and reaches a predetermined level an output signal is provided for operating pilot relay 24. If this output signal persists for a predetermined period as measured by time delay means 26 then the breaker 10 is caused to open. Expiration of the time delay providing a signal for operation of the breaker opening mechanism. Additionally, the reverse current level is monitored by an additional set of relay current transformers 28a, 28b, 28c that are effective to cause immediate opening of the breaker if a predetermined level of current in the reverse direction is exceeded.

Operation of the trip mechanism of the circuit breaker may be initiated by the presence of reverse current in any one of the three phases or conductors of the network. Each of the phases is equipped with a similar protective system and therefore only one will be described in detail with the addition of an alphabetic designation to indicate to which of the related phase conductors A, B, C the apparatus being described belongs. The current flowing in conductor A is monitored by network current transformer 18A whose output is connected to the primary windings of the relay current transformers 20A, 28A for that phase. Transformer 20A is a pulse transformer having a toroidal core with high residual induction and a peak flux density only slightly higher. Commercially available cores of "Deltamax" a product of the Arnold Engineering Company have been found to have the requisite properties. These cores are described in detail in an Arnold Engineering Company Bulletin "Technical Data on Arnold Tape-Wound Cores-Bulletin TC–101A reprinted June 1962." The pulse transformer has no output until the flux in the core has overcome the residual induction; the output signal appears in the secondary winding until the core saturates, a short time later. The result is a short duration pulse that occurs at some time after the current wave passes through zero. The secondary winding of the pulse transformer is connected to the comparison means 22. The comparison means 22 includes a silicon controlled rectifier (SCR) 30A. Selector switch 32 enables the introduction into the gate circuit of the SCR 30A of an adjustable balancing resistor 34A, 36A, 38A to select the sensitivity desired. The resistors 34A, 36A, 38A are connected across the output winding of the relay transformer 20A through a return conductor and a common ground bus 39. The SCR gate circuit also includes a biasing resistor 40A and a Zener diode 42A.

Network potential transformers 14AB, 14BC are connected through fuses 44 between conductors A, B and C. The input and output windings of the network potential transformers are connected in delta. Relay potential transformers 16A, 16B, 16C have their primaries connected in delta to the output terminals of the monitoring potential transformers 14AB, 14BC. The output windings of the relay potential transformers 16A, 16B, 16C are connected in Y by conductor 46. Conductor 46 is connected to the negative bus 52 of 3 phase D.C. power supply 50. The D.C. power supply includes diodes 54A, 54B, 54C connected to a respective one of the potential transformers 16A, 16B, 16C and to the positive bus 56 of the power supply. Filter capacitor 58 and Zener diode 60 are connected between the positive and negative busses.

The potential transformers 16A, 16B, 16C are also connected to the anode-cathode circuits of the respective SCR's 30A, 30B, 30C. The return path is common conductor 62 that is connected to operating coil 48 of the pilot relay 24, through the coil and then by conductor 46 back to the transformers. A smoothing capacitor 53 is connected in parallel with coil 48. The relay potential transformers energize the pilot relay 24 when a respective SCR conducts as will be described in detail below.

The circuit breaker operating means includes a latch operating coil 64 for contacts 66 in series with the operating mechanism 12 of the breaker 10. The coil 64 is in the anode-cathode circuit of silicon controlled rectifier 68 in the time delay means 26. SCR 68 is rendered conductive either after a preselected time delay which is initiated by the presence of a reverse current on the monitored network or in an instantaneous operation, by the presence of a high reverse current which overrides the time delay. In either case the operation of SCR 68 is dependent upon the operation of the pilot relay 24. Pilot relay 24 includes three single pole double throw contacts 70, 72, 74, operated simultaneously by the coil 48. Contacts 70, when operated, connect the positive DC bus 56 to the anode-cathode circuit of the SCR 68. Various periods of time delay are provided by a selected one of resistors 76, 78, 80 connected to timing capacitor 82 by switch 84 in an RC circuit. Resistors 76, 78, 80 and capacitor 82 are connected by conductor 86 to the DC bus 56. Voltage stabilization is provided by resistor 88 and a Zener diode 90. A unijunction transistor 92 is connected between conductor 86 and the negative bus 46 between resistors 94, 96. The output of the unijunction transistor 92 is connected to the gate circuit of SCR 68 through a resistor 98. The connection point 100 between the time relay resistors 76, 78, 80 and timing capacitor 82 is connected to the emitter of the unijunction transistor 92 through diode 102 and resistor 104. In the normally closed condition of contacts 72 the timing capacitor 82 is short circuited. This assures that the start of the timing cycle on each subsequent operation will be from the same zero point. When the pilot relay 24 is operated, contacts 72 are opened and the DC voltage is applied across the selected resistor 76 and capacitor 82 in series. When the voltage on a capacitor has risen sufficiently, the unijunction transistor 92 conducts and SCR 68 is made conductive to operate the relay 64.

The reverse current monitoring transformers 28A, 28B, 28C, are connected in parallel through respective diodes 106A, 106B, 196C and output balancing resistors 108A, 108B, 108C. Their rectified output appears between conductor 110 connected to the base of transistor 112 in the time delay means 26 and common conductor 46 to which they have a common connection. The third set of contacts 74 of the pilot relay 24 are normally closed. In the normally closed position the contacts short the output of the current monitoring transformers 28A, 28B, 28C. When the pilot relay 24 is energized the output is connected to transistor 112 that is connected to the gate circuit of the SCR 68 so as to bypass the timing circuit previously described. In the event that reverse current level exceeds the predetermined level the signal input to the transistor 112 is sufficient to cause operation of the SCR 68 and therefore operation of the latch coil relay 64 to cause opening of the circuit breaker 10. Zener diode 116 and capacitor 118 are connected in parallel in the output circuit of transistor 112. The operation of the time delay bypass by high forward currents is avoided by the short circuiting contacts 74. Unless the pilot relay 24 has been operated no current-level signal can reach the transistor 112.

The operation of the pilot relay 24 depends upon the occurrence of a current reversal in the monitored network A, B, C. The reversal is detected by the pickup trigger SCR (30A, 30B, 30C) of the conductor suffering the current reversal. In order to better understand the mode of operation of the illustrative embodiment described above reference is made to FIGS. 1, 2 and 5. In the following description reference will be made to the operation of only the A phase. It will be understood by those skilled in the art that similar response can be expected in the B and C phases. Silicon controlled rectifiers, such as those employed as the pickup triggers 30A, 30B, 30C, can be conductive only when their anode is positive with respect to their cathode and can be "turned on" only when the gate circuit is made positive at the same time. Note that SCR's 30 function in alternate half waves but if two sets of SCR's, oppositely poled, were used, then the system would function in each succeeding half wave. A first signal 200 (FIG. 2) responsive to the voltage on conductor A is provided at SCR 30A by the network potential transformers 14AB, 14BC and the relay potential transformer 16A. A second signal, in the form of a pulse 202, responsive to the current 204 flowing in the conductor A appears at the gate circuit of the SCR 30A. The pulse 202 is the output signal of the pulse transformer 20A whose input is shown at 204. The high residual magnetism and low flux saturation point of the core of the pulse transformer provide pulse 202 whose start follows current zero by about 25°. The pulse is of short duration; approximately 10°. In the illustration of FIG. 2 the voltage wave 200 and the current wave pass through 0 at the same time and are said to be at unity (1.0) power factor. The arrangement of potential and current transformers shown in FIG. 1 results in the voltage signal 200 and the current pulse 202 being of opposite polarity. Therefore when the anode-cathode circuit of SCR 30A is polarized for conduction the gate circuit due to pulse 202 is negative and SCR 30A is not conductive.

When a reversal of current direction on conductor A occurs as when there is fault on the feeder A', then the current 204' (FIG. 5) is shifted by 180° and the pulse 202' is likewise shifted. The voltage wave 200' and pulse 202' are now positive at the same time and if the reverse current level is significant as determined by its overcoming the bias in the SCR 30A gate circuit then SCR 30A is made conductive. The responsive level is adjustable by switch 32 that selects one of the preset adjustable resistors 34A, 36A, 38A. (It should be noted that for purposes of illustration only it is assumed that the power factor is unchanged even when the fault occurs.) When SCR 30A conducts the pilot relay 24 is energized by pulsating DC applied to coil 48 and parallel capacitor 53. The energy stored in capacitor 53 keeps the relay 24 from chattering. Operation of the relay 24 closes contacts 70 connecting the anode-cathode circuit of SCR 68, including relay coil 64 to the DC bus 56. The contacts 72 and 74 are opened. Opening of contacts 72 removes the short circuits from across the timing capacitor 82 thereby starting the time delay. Opening of contacts 74 removes the short circuit across the DC output of the current transformers 28A, 28B, 28C. If the reverse current persists at a level high enough to keep turning SCR 30A on alternate half cycles then the voltage across timing capacitor 82 continues to rise. The charging time of capacitor 82 and therefore the time delay is selected by switch 84 that connects one of the resistors 76, 78, 80 in series with the capacitor. When the voltage on the capacitor reaches the firing voltage of the unijunction transistor 92 it is turned on and its output signal is applied to the gate of the SCR 68 turning it on and causing relay 64 to close its contacts 66 and initiate the opening of circuit breaker 10. If the reverse current is momentary in nature, then the relay 24 would be de-energized and the shorting contacts 72 across the timing capacitor 82 will, in effect, reset the time delay for the next operation of the relay 24.

When the reverse current approaches 100% of the full load forward current, it is desirable that the time delay be bypassed and the relay 64 be energized at once. This response is achieved by current transformer 28A, 28B, 28C whose output is rectified by diodes 106A, 106B, 106C and applied to transistor 112 with shorting contacts 74 open. When the current level causes an output signal across resistor 114 that is sufficient to operate transistor 112 then SCR 68 is turned on and relay 64 operated. This circuit is so proportioned that the output is inadequate the operate SCR 68 below the 100% level.

Referring to FIG. 3 the condition illustrated is 90° lag, 0.0 power factor, forward current. The voltage signal 206 leads the current signal 208 by 90°. The pulse 210 and the voltage signal 206 do not overlap so that the SCR 30A remains non-conducting. In FIG. 6, a current flow reversal with the same characteristics has occurred and, even with the 90° lag, 0.0 power factor, the pulse 210' and the voltage signal 206' overlap and will render SCR 30A conducting.

Adverting to FIG. 4 the condition illustrated is of the current leading the voltage with the power factor at 0.9, forward current. The voltage signal 212 lags behind the current signal 214. The pulse 216 and the voltage signal 212 do not overlap so SCR 30A remains non-conductive. In FIG. 7, a current flow reversal with the same characteristics has occurred and the pulse 216' and voltage signal 212' do occur positively at the same time on SCR 30A rendering it conducting.

The pairing of examples above is for purposes of illustration only. Those skilled in the art will readily recognize that wide changes in power factor can be accommodated without false tripping and yet desired sensitivity is retained by the illustrative embodiment of the invention. While only one phase operation has been described in detail similar results are obtained with faults on any of the conductors A, B, C.

It will be recognized that the pulse, for example, pulse 202 is displaced substantially from the start of the generating signal 204. It is this displacement that allows shifting of the signals with respect to one another, because of changing power factor, without causing false tripping i.e., tripping does not occur unless the polarity of the pulse and the polarity of the reference signal are in accord due to current reversal. While the illustrative embodiment illustrates the use of the current signal as the source of the pulse it is understood that a voltage responsive pulse could be used for the same purposes without departing from the invention.

Although only one embodiment of the invention has been shown and described in detail it will be apparent to those skilled in the art that various changes and modifications may be made herein without departing from the spirit and scope of the invention.

What is claimed is:

1. A reverse current sensing network for protecting an alternating current system against reverse current including first means for providing a first signal representing a phase voltage of the system, second means for providing a second signal representing a phase current of the system, pulse forming means connected to one of said signal providing means and providing an output pulse displaced substantially from the start of at least some half cycles of said signal, said pulse having time and polarity relationship to the other said signal indicative of the direction of power flow, comparison means responsive to said pulse and said other signal, and output means operatively connected to said comparison means, said comparison means initiating operation of said output means in response to that relationship of said pulse and said other signal which corresponds to the reversal of the direction of current flow through said system.

2. A reverse current sensing network according to claim 1 further including time delay means interposed between said comparison means and said output means to inhibit the initiation of operation of said output means in response to spurious signals.

3. A reverse current sensing network according to claim 2 further including time delay bypass means responsive at levels of one of said signals above a predetermined level for bypassing said time delay to provide immediate response of said output means to said comparison means.

4. A reverse current sensing network according to claim 1 wherein said comparison means includes a silicon controlled rectifier having its anode-cathode circuit and said output means connected in series to one of said signal providing means and having the gate circuit thereof connected to said pulse forming means wherein said first and second signals are normally oppositely polarized and said silicon controlled rectifier remains nonconductive, said first and second signals becoming alike in polarity when reversal of current occurs thereby causing said SCR to become conductive and operation of said output means to be initiated.

5. A reverse current sensing network according to claim 4 wherein said pulse forming means includes a pulse transformer that includes a magnetic core having a high residual induction and a relatively low peak flux density, an input winding and an output winding on said core, said core saturating close to the start of current flow through the input winding, said current flow producing an output pulse in said output winding, said pulse being applied to said comparison means as aforesaid.

6. A reverse current sensing network for protecting multi-conductor alternating current system against reverse current including first sensing means connected between a first and a second conductor of said system providing a first signal responsive to a phase voltage, second sensing means operatively connected to said first conductor providing a second signal responsive to the current in said conductor, pulse forming means connected to said second sensing means and providing an output pulse close to the start of each succeeding half cycle of current, said pulse having time and polarity relationship to said first signal indicative of the direction of power flow, comparison means connected to said pulse forming means and to said first sensing means and responsive to said pulse and sair first signal, and output means operatively connected to said comparison means, said comparison means initiating operation of said output means in response to that relationship of said pulse and said first signal which corresponds to the reversal of the direction of current flow through said system.

7. A reverse current sensing network according to claim 6 further including time delay means interposed between said comparison means and said output means to inhibit the initiation of operation of said output means in response to spurious signals.

8. A reverse current sensing network according to claim 7 further including time delay bypass means responsive at levels of said second signal above a predetermined level for bypassing said time delay to provide immediate response of said output means to said comparison means.

9. A reverse current sensing network according to claim 6 wherein said comparison means includes a silicon controlled rectifier having its anode-cathode circuit and said output means connected in series to said first sensing means and having the gate circuit thereof connected to said pulse forming means wherein said first and second signals are normally oppositely polarized and said silicon controlled rectifier remains nonconductive, said first and second signals becoming alike in polarity when reversal of current occurs thereby causing said SCR to become conductive and operation of said output means to be initiated.

10. A reverse current sensing network according to claim 9 wherein said pulse forming means includes a pulse transformer that includes a magnetic core having a high residual induction and a relatively low peak flux density, an input winding and an output winding on said core, said core saturating close to the start of current flow through the input winding, said current flow producing an output pulse in said output winding, said pulse being applied to said comparison means as aforesaid.

References Cited

UNITED STATES PATENTS

| | | | |
|---|---|---|---|
| 2,986,674 | 5/1961 | Baude | 317—43 |
| 3,248,609 | 4/1966 | Gambale | 317—43 X |
| 3,396,310 | 8/1968 | Logan | 317—39 |
| 3,453,495 | 7/1969 | Thomas | 317—39 X |

JAMES D. TRAMMELL, Primary Examiner

U.S. Cl. X.R.

307—127; 317—33, 39, 43